United States Patent [19]

Quaglia

[11] Patent Number: 4,988,218

[45] Date of Patent: Jan. 29, 1991

[54] THRUST BEARING FOR A PRESSURIZED LUBRICATING SYSTEM AND AN O-RING

[76] Inventor: Lawrence D. Quaglia, 917 Quincy Ave., Bronx, N.Y. 10465

[21] Appl. No.: 266,086

[22] Filed: Nov. 2, 1988

[51] Int. Cl.[5] .................. F16C 33/10; F16C 33/66
[52] U.S. Cl. ...................... 384/322; 184/6.5; 384/127; 384/473; 384/475
[58] Field of Search .............. 384/126, 127, 322, 368, 384/369, 371–373, 396, 420, 424–427, 462, 457, 473–475, 477, 481, 482, 487, 489; 184/6.5; 277/216–222

[56] References Cited

U.S. PATENT DOCUMENTS

| | | | |
|---|---|---|---|
| 2,986,430 | 5/1961 | Banerian | 384/127 |
| 3,021,182 | 2/1962 | Schnacke | 384/473 |
| 3,096,850 | 7/1963 | Rosenqvist | 184/6.5 |
| 3,309,096 | 3/1967 | Inka | 277/222 |
| 3,351,392 | 11/1967 | Powell | 384/13 |
| 3,677,613 | 7/1972 | Houtz | 384/420 |
| 3,829,173 | 8/1974 | Stedman | 384/138 X |
| 4,373,739 | 2/1983 | Klem | 384/420 X |

Primary Examiner—Thomas R. Hannon

[57] ABSTRACT

A thrust bearing or thrust bearings are adapted to be used in pressurized lubricating systems to maintain lubricant under pressure in these systems. The pressure assures improved lubrication and particularly with a grease lubricant improves lubrication and system life, and maintains the system free of voids and contaminants. Seals within the system maintain pressure and prevent lubricant outflow while functioning with static and/or moving parts. Round or square cross-sectioned O-rings preferably act as seals. A special O-ring having separable end segments may be used in the systems with the thrust bearings to seal against pressure and lubricant outflow.

17 Claims, 6 Drawing Sheets

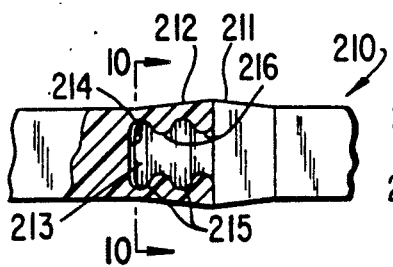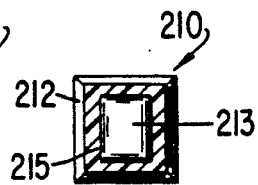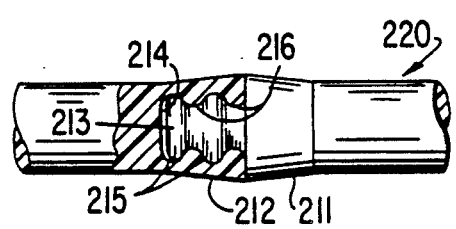
Fig.9  Fig.10  Fig.11
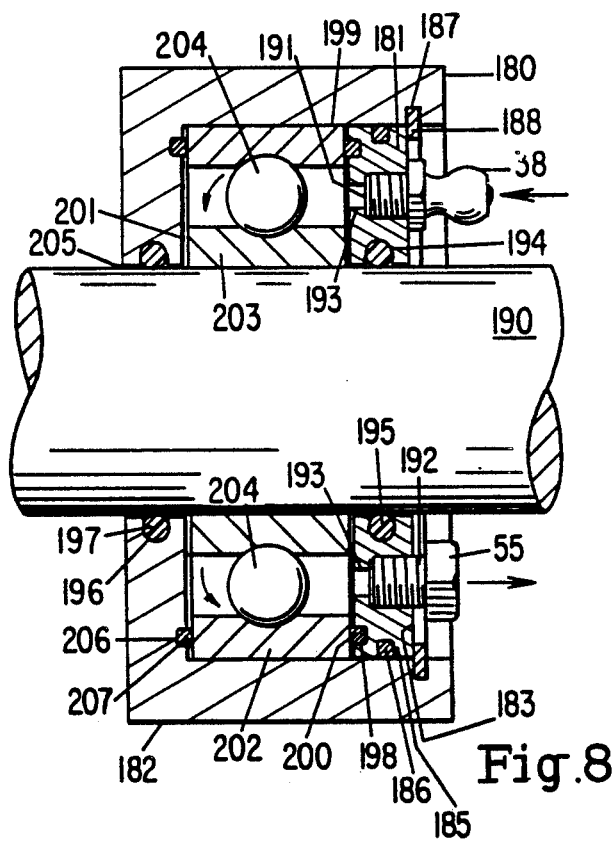
Fig.8
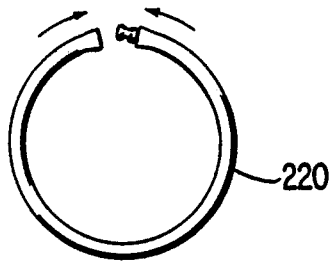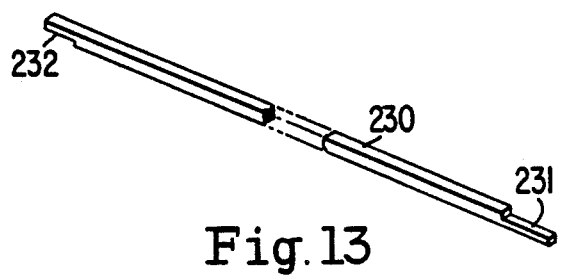
Fig.12  Fig.13

THRUST BEARING FOR A PRESSURIZED LUBRICATING SYSTEM AND AN O-RING

BACKGROUND OF THE INVENTION

1. Field of the Invention

The present invention deals with a thrust bearing for a pressurized lubricating system for lubricating bearings and bearing surfaces of moving parts. The present invention also deals with an O-ring seal for certain applications of the present invention. The invention provides the wherewithal to maintain a lubricant under pressure, so that the entire bearing and all its surfaces are fully lubricated. The pressure in a pressurized lubricating system is a maintained pressure, thus an objective of the use of a thrust bearing of the present invention in a pressurized lubricating system is to lubricate, and to be able to eliminate voids within the system, which may degrade the system by faulty distribution of lubrication or by providing pockets that may hold or receive contaminants or corrosives.

In one application a thrust bearing enables a pressurized lubricating system involved with movable bearings and moveable shafts to improve lubrication and properly function over a long term with a minimum need for maintenance. A pressurized lubricating system may be particularly provided with a hydraulic lubricant receiving fitting and a hydraulic pressure relief fitting to relieve excess pressure. The hydraulic pressure relief fitting maintains pressure and acts as an indicator that the pressurized lubricating system is full and fully pressurized. The initial outflow of lubricant from the hydraulic pressure relief fitting without sputtering indicates that the pressure constant has been achieved and that the pressurized lubricating system is fully lubricated.

The thrust bearing is operable in a pressurized lubricating system having shafts, movable bearings, a hydraulic lubricant receiving fitting and a hydraulic pressure relief fitting. The pressurized lubricating system may include needles, balls or tapered bearings. The pressurized lubricating system guides flow paths so that in lubricating, all voids are initially filled. A preferred flow path, in some pressurized lubricating systems is through the outer race of a bearing set, through its inner race and through to a hydraulic pressure relief fitting.

The lubricant path is through the thrust bearing which is adapted to maintain the lubricant within the pressurized lubricating system and further adapted to maintain pressure and direct lubricant flow. Lubricant may oftentimes flow through shafts about which rotation is had, or may even be through rotatable shafts.

With at least one thrust bearing in place, a lubricant may be directed to flow to movable bearings, such as rollers, needles or tapered bearings and fill the entire bearing system under pressure, without voids.

In a pressurized lubricating system including a crankshaft thrust bearings of the present invention, enables a liquid lubricant to be maintained under a higher than normal pressure distributed over the bearing surfaces. In a pressurized lubricating system including a crankshaft. The thrust bearing may be a split bearing, held together around a bearing shaft.

2. Description of Background Art

U.S. Pat. No. 429,507 discloses a reservoir system including openings in a shaft for the lubrication of a pulley.

U.S. Pat. No. 461,151 discloses a pressurized lubricating system for circulating lubricant under pressure, to be circulated about a rotating shaft.

U.S. Pat. No. 763,409 discloses a prior art system including a reservoir for holding a lubricant and a sleeve. The system includes a sleeve with longitudinal and annular grooves and openings, enabling the lubricant to reach all surfaces and be distributed around moving parts.

U.S. Pat. No. 824,187 discloses a journal box with an oil pumping system for distributing oil about a moving shaft. There are channels and openings within the Babbitt metal for the introduction and circulation of the lubricant, which is pumped under pressure throughout the system.

U.S. Pat. No. 867,823 discloses a journal box with various channels and openings for lubricating a rotatable shaft.

U.S. Pat. No. 1,335,668 discloses a journal box bearing lubricated by a set of perforated co-active fiber bearings.

U.S. Pat. No. 1,437,560 discloses a high speed bearing where a lubricant is circulated through a hollow shaft with openings.

U.S. Pat. No. 1,559,879 discloses a bearing system including rings and cloth strips, which may be adjusted along the shaft.

U.S. Pat. No. 1,634,123 discloses a crankshaft lubricating system for lubricating under pressure with lubricating ports in the piston rods where they are connected to the crank pins.

U.S. Pat. No. 1,948,340 discloses bearing halves with an interrupted groove designed to increase pressure and improve lubrication at a crankshaft.

U.S. Pat. No. 1,974,484 discloses a stuffed journal bearing for the discharge of lubricant onto a rotating shaft.

U.S. Pat. No. 2,490,293 is a complex system of retaining oil and lubricating crank pins under pressure.

U.S. Pat. No. 2,628,602 is an improved system for increasing the impact cushioning properties of a lubricant film between bearing surfaces.

U.S. Pat. No. 2,673,131 discloses a lubricating system with helical grooves in a journal portion for the distribution of lubricant.

U.S. Pat. No. 3,076,523 discloses a lubricating system for lubricating the bearing surfaces of a shaft. The shaft is sealed while lubricant is provided to the shaft between the seals and collected for recirculation.

U.S. Pat. No. 3,096,850 is an anti-friction bearing with seals remote from a crankshaft throw, provided with rotating pockets to collect lubricant from adjacent anti-friction bearings, including an expanding sealing ring in a groove in the outer surface of an anti-friction bearing.

U.S. Pat. No. 3,351,392 discloses a pressure lubricating system including grooved channels and passages including O-rings closing off oil passages.

U.S. Pat. No. 3,744,580 discloses a bearing system including ball bearings, friction bearings and seals within a lubricating system adapted to meet varying conditions and pressure relief at seals.

U.S. Pat. No. 3,929,394 is a split sealed main journal lubricating system.

U.S. Pat. No. 4,576,488 discloses a bearing bushing with a grease fitting in a bearing having grooves and openings for the circulation of lubricant where advantageous circulation of grease is obtained with openings and channels, but with a free discharge of the grease.

West German Patent No. 1,267,474 discloses a crankshaft with oblique lubricating channel portions for lubricating piston rod shafts.

SUMMARY OF THE INVENTION

The present invention is a thrust bearing for a pressurized lubricating system. The thrust bearing of the present invention includes seals, to maintain lubricant under pressure distributed over bearing surfaces. The pressure in the pressurized lubricating system distributes the lubricant and maintains an improved, effective lubrication for a long period of time and maintains protection against the intrusion of contaminants and corrosives.

Pressure may be maintained in a pressurized lubricating system by use of hydraulic lubricant receiving fittings and hydraulic pressure relief fittings, or pressure may be otherwise maintained by the nature of the pressurized lubricating system itself.

Particularly in systems employing grease, the lubricant flow under pressure, fully lubricates the entire bearing system, purged of voids. The purging protects against lubrication failure and the intrusion of corrosives into the system, thus, maintaining the lubricated integrity of the bearings as well as protecting the bearings themselves against corrosive degeneration.

The thrust bearings with their passages and seals distribute lubricant and maintain pressure within the system.

In pressurized lubricating systems employing grease, it is oftentimes advantageous to include pressure relief valves to maintain existing pressure and also to provide evidence that grease has filled the entire bearing area.

Where appropriate, the lubricant flow pattern is divided to start at the outside of a bearing set and flow towards the inside, as it is distributed. Where there are multiple and/or adjacent bearing sets, the lubricant is directed to be distributed from the outside or outer race of each bearing set.

The thrust bearing of the present invention for a pressurized lubricating system includes a body engaged at a hub in the lubricating system. The body is sealed against outflow of lubricant at the hub. The body is also engaged at a shaft in the lubricating system and it includes an opening to receive the shaft passing through. The body is sealed against outflow of lubricant at the shaft. The body is also retained within the lubricating system.

The hub seal against outflow of lubricant may include at least one O-ring which may have a square cross-section. The body may include at least one circumferential groove. The hub seal O-ring may fit into the circumferential groove. The shaft seal against outflow of lubricant may include at least one O-ring which may have a round cross-section. The shaft seal O-ring may fit in the body opening's circumferential groove.

The shaft seal of the body, against outflow of lubricant may include a pair of O-rings and a pair of circumferential grooves with the pair of shaft seal O-rings fitting into the grooves and the body may include at least one passage to guide lubricant either to or from the shaft with an opening at one end between the shaft seal O-rings. The body may include a face juxtaposed to bearings in the lubricating system. The face may include a circumferential groove, with the passage opening to the circumferential groove so that the circumferential groove may guide lubricant either to or from bearings in the lubricating system.

The shaft seal against outflow of lubricant including a pair of O-rings may include an inner circumferential groove between the pair of shaft seal O-rings.

The basic hub seal against outflow of lubricant may include more than one hub seal including an O-ring, which may have a square cross-section and which may fit in a groove to guide lubricant in the system either to or from bearings in the lubricating system.

The thrust bearing may include fittings in the body to receive and retain grease under pressure in the lubricating system or there may be fittings in the lubricating system to receive and retain the grease under pressure and release grease under selected pressure. The fittings in the body to retain grease under pressure may also release grease under selected pressure.

The shaft seal against outflow of lubricant may include a pair of O-rings and a pair of circumferential grooves in which the pair of shaft seal O-rings fit. The body may include at least one passage to guide lubricant either to or from the shaft. The passage may have an opening at one end between the shaft seal O-rings. The body may also include a fitting to receive grease under pressure and to maintain the grease in the system under such pressure, the receiving fitting opening to the passage in the body.

The shaft seal against outflow of lubricant may include a pair of O-rings and a pair of circumferential grooves in which the pair of shaft seal O-rings fit. The body may include at least one passage to guide lubricant either to or from the shaft. The passage may have an opening at one end between the shaft seal O-rings. The body may also include a fitting to retain grease under pressure and to release grease in excess of a selected pressure the retaining fitting opening to the passage in the body.

The thrust bearing of the present invention may be in a pressurized lubricating system including bearings. The thrust bearing may include a body engaged at a hub which may be an encasement. The body may be sealed against outflow of lubricant at the encasement. The body may be also engaged at a shaft in the lubricating system and include an opening to receive the shaft passing through, the body. The body may be sealed against outflow of lubricant at the shaft. The body may also be retained within the lubricating system.

The encasement seal against outflow of lubricant may include at least one O-ring which may have a square cross-section. The body may include at least one circumferential groove within the encasement seal O-ring fitting into the circumferential groove. The shaft seal against outflow of lubricant may include at least one O-ring which may have a round cross-section. The shaft seal O-ring may fit in the body opening's circumferential groove.

The basic encasement seal of the body against outflow of lubricant may include more than one encasement seal including an O-ring, which may have a square cross-section and which may fit in a groove to guide lubricant in the system either to or from bearings in the lubricating system.

In the encasement the body may include at least one passage adapted to guide lubricant either to or from the bearings. The body may include at least one further circumferential groove with the passage opening to the further groove, the further groove to guide lubricant in the system either to or from the bearings in the lubricating system.

In the encasement the thrust bearing may include fittings in the body to receive and retain grease under pressure in the lubricating system or there may be fittings in the lubricating system to receive and retain the grease under pressure and release grease under selected pressure. The fittings in the body to retain grease under pressure may release grease under selected pressure.

The encasement itself may include seals in the lubricating system to seal lubricant from outflow from the encasement.

The thrust bearing of the present invention for a pressurized lubricating system including a body having more than one section adapted to be engaged at a hub in a lubricating system. The body may be sealed against outflow of lubricant at the hub. The body may also be engaged at a shaft in the lubricating system. The body includes an opening to receive a shaft passing through. The body may be sealed against outflow of lubricant at the shaft. The body may also be retained within the lubricating system. The shaft may be a crankpin and the body may includes two section. The hub seal against outflow of lubricant includes an O-ring which may have a square cross-section. The crankpin seals against outflow of lubricant may include at least one O-ring which may have a round cross-section and may be in a circumferential groove in the body. The crankpin seal may include a pair of O-rings and may be in a circumferential groove in the body. The body may include a passage to guide lubricant either to or from the crankpin, the passage opening at one end between the shaft seal O-rings. There may be an inner circumferential groove between pair of shaft seal means O-rings. The sections of the body may be joined by screws.

The multisection body may have multisection O-ring seals including two section O-ring seals. The O-rings preferably include means to seal the ends of the sections against outflow of lubricant from the system. The ends of the sections may include a flared portion and some of the O-ring seals may have a square cross-section and fit in a groove in the body.

The crankpin seal O-rings may include a closable joint which may include an interfitting connection and the O-rings preferably include means to seal the ends of the sections against outflow of lubricant from the system. The interfitting connection may include an opening and an extension adapted to fit into the opening. The interfitting connection may include means to retain the opening and extension interfit. These means may include fluting.

The crankpin seal O-rings may include a stepped joint and the O-rings preferably include means to seal the ends against outflow of lubricant from the system. The ends of the sections may include a flared portion and the O-ring may include a square cross-section and fit in a groove in the body.

A sectioned or interfit seal does not necessarily have to be used with a sectioned body.

The body of the thrust bearing may be retained in the lubricating system by a retaining ring which may be engaged in the lubricating system in a groove. The retaining ring may be a resilient C-ring.

The lubricating system in which the thrust bearing is engaged may include rotatable bearings such as balls, needles and tapered bearings. The bearings may rotate within races particularly in lubricating systems employing grease. There may be hub seals and shaft seals including O-rings in such systems. The shaft seal may include a pair of O-rings and the body includes a passage to guide grease either to or from the shaft. The passage is open at one end between the shaft seal O-rings. The lubricating system may receive and retain grease under pressure and may release grease in excess of a selected pressure. Rotatable bearings may be mounted on the shaft. Grease is guided to fill the lubricating system substantially without any voids. The bearing set may include at least an outer race and may include an inner race. The outer race may have an opening to guide the grease to fill the lubricating system and to guide the grease through the bearings to the shaft. The outer race may have a channel intersecting the opening. The grease may further be guided through the shaft. The grease may be guided in a path from the race opening through the shaft. The fittings to receive and retain grease under pressure may be divided between the body and the shaft.

The lubricating system may include more than one thrust bearing bodies or sets of thrust bearing bodies.

The O-ring element may include a body having ends forming a closable joint. The O-ring body may have a round cross-section or have a square cross-section. The closable joint may include an interfitting connection and may further have an opening and an extension to fit into the opening and be retained in the opening interfit by means such as fluting. The ends of the O-ring body may be flared. The O-ring body may include a closable stepped joint which may overlap at the ends and which may be flared. Although such novel feature or features believed to be characteristic of the invention are pointed out in the claims, the invention and the manner in which it may be carried, may be further understood by reference to the description following and the accompanying drawing.

A BRIEF DESCRIPTION OF THE DRAWINGS

FIG. 8 is a detail section of a rotatable shaft in an pressurized lubricating system encasement including a thrust bearing of the present invention.

FIG. 9 is a partially cut-away detail of a square crosssection O-ring of the present invention.

FIG. 10 is a section of FIG. 9 at lines 10—10.

FIG. 11 is a partially cut-away detail of a round cross-section O-ring of the present invention.

FIG. 12 is an exploded view of the O-ring of FIG. 11.

FIG. 13 is an view of square cross-section O-ring seal extended linearly, with stepped ends.

Referring now to figures in greater detail, where like reference numbers denote like parts in the various figures.

DESCRIPTION OF THE PREFERRED EMBODIMENTS

Figure 1:
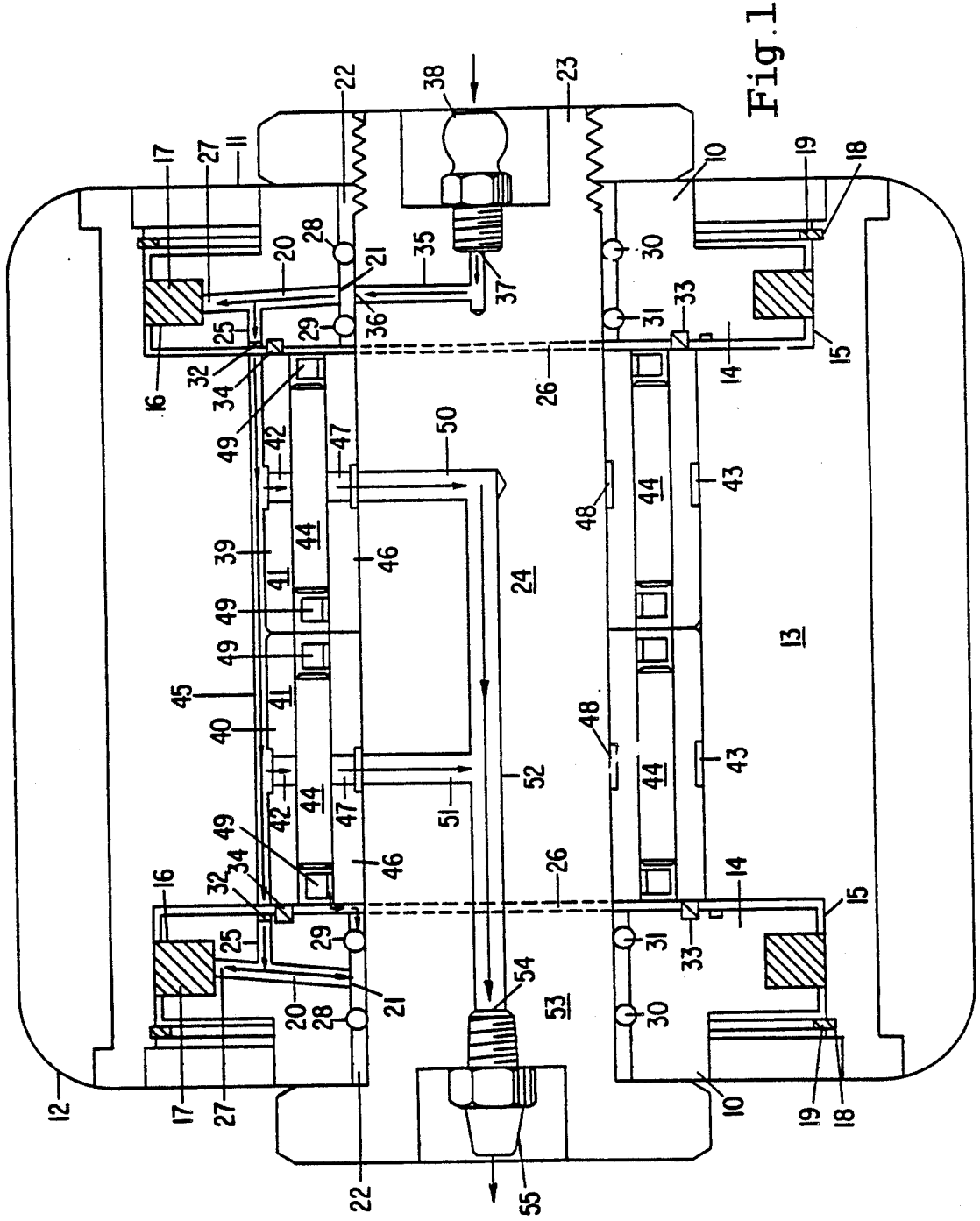
FIG. 1 is a section of a wheel on a hub employing thrust bearings of the present invention in a pressurized lubricating system.

The thrust bearing 10 of the present invention as shown in FIG. 1 is in a pressurized lubricating system 11, as shown in the wheel 12. The wheel 12 includes a hub 13. The thrust bearing 10 has a body 14, which is retained in a countersunk portion 15 of the hub 13.

The body 14 includes a circumferential groove 16 adapted to receive a circumferential square cross-section O-ring 17. The O-ring 17 abuts the countersunk portion 15 of the hub 13 and forms a seal against outflow of lubricant from the pressurized lubricating system 11.

The hub 13 includes a groove 18 adapted to receive a retaining ring 19, which holds the body 14 within the countersunk portion 15 of the hub 13. The square cross-section O-ring 17 forms a seal between the hub 13 and the body 14.

The body 14 includes a passage 20 which opens at one end 21 into a body opening 22. The body opening 22 is adapted to receive an end 23 of a shaft 24 therethrough. Another end 25 of the passage 20 opens to a face 26 of the body 14. The passage 20 may also have an opening 27 to the circumferential groove 16 in the body 14, which is sealed by the square cross-section O-ring 17.

Within the body opening 22, straddling the passage opening 21, are circumferential grooves 28 and 29, into which are fit round cross-section O-rings 30 and 31. The round cross-section O-rings 30 and 31 abut the shaft end 23, forming a seal. The passage opening 25 opens into a circumferential groove 32 in the body 14. In the face 26 of the body 14 there is another groove 33, into which is set another square cross-section O-ring 34, which is inward of the passage opening 25. The shaft end 23 includes a passage 35, having an opening 36 between the two round cross-section O-rings 30 and 31. The other end 37 of the passage 35 is closed by a hydraulic lubricant receiving fitting 38.

Engaged on the shaft 24 is a first bearing set 39 and a second bearing set 40. The bearing sets 39 and 40 include outer races 41 which have openings 42. The openings 42 open at one end into circumferential channels 43 in the outer races 41 and the openings 42 open to needles 44 at their other end. The channels 43 intersect a longitudinal channel 45 in the hub 13. The bearing sets 39, 40 include inner races 46. The inner races 46 include openings 47, which intersect circumferential channels 48 in the inner races 46.

The needles 44 are retained in the bearing sets 39, 40 by cages 49. The shaft 24 includes passages 50, 51 and 52. The passage 50 opens to the groove 48 of the inner race 46 of the first bearing set 39. The passage 51 opens to the channel 48 of the inner race 46 of the second bearing set 40. Both passages 50 and 51 open to the passage 52, passing through the shaft 24 to the other end 53 of the shaft 24 where the passage 52 has an end 54 at a hydraulic pressure relief fitting 55. A second thrust bearing 10 is retained in the pressurized lubricating system 11 at the other end 53 of the shaft 24.

Figure 2:
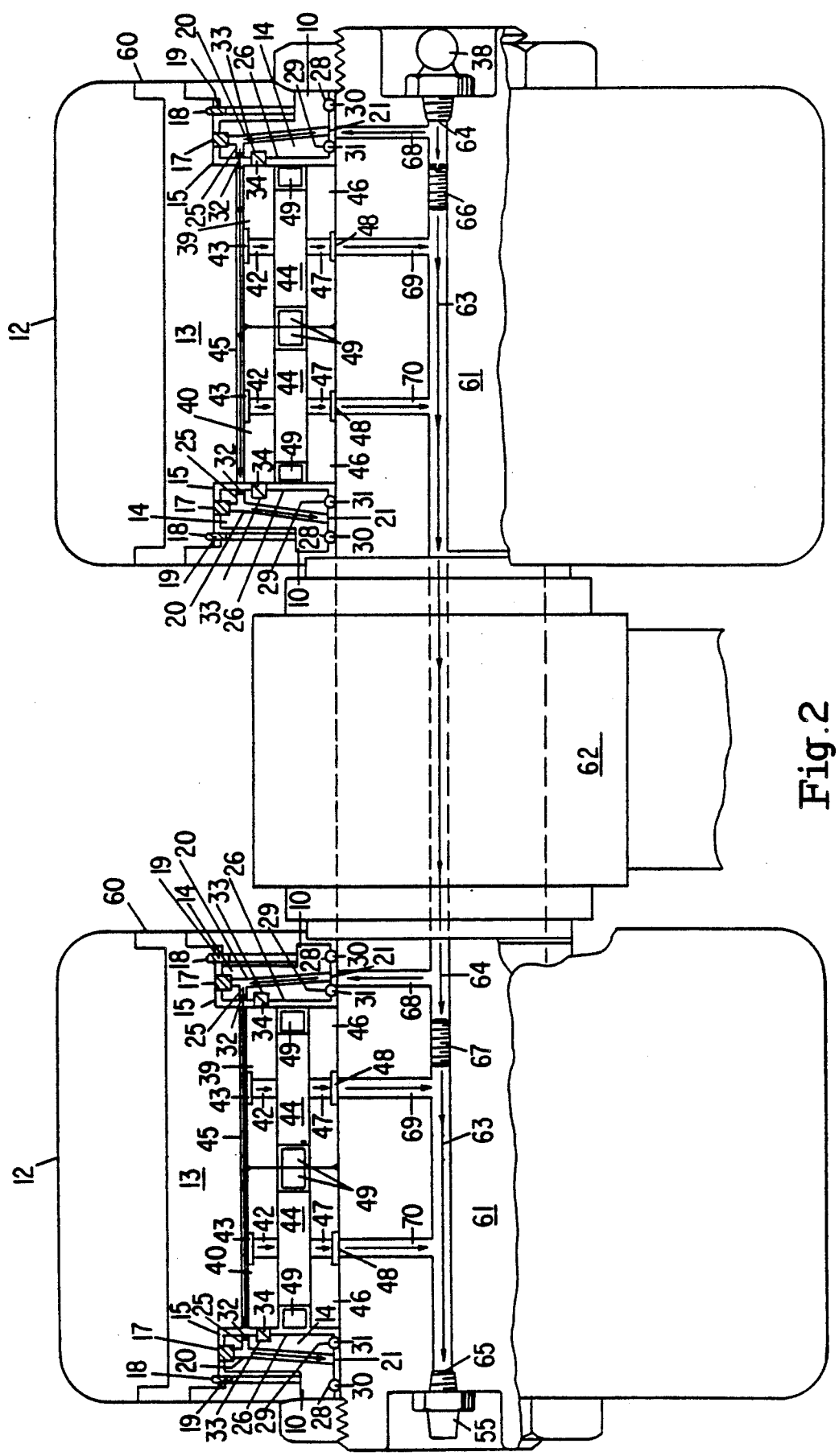
FIG. 2 is a cut away view of two wheels on a hub employing thrust bearings of the present invention in a pressurized lubricating system.

In FIG. 2, a pressurized lubricating system 60 includes a pair of wheels 12 on a shaft 61. The shaft 61 is mounted on a support 62. Each wheel 12 has a pair of thrust bearings 10.

As shown in FIG. 2, the shaft 61 has a passage 63 through the shaft 61. The shaft 61 is held by and passes through the support 62. The passage 63 has an end 65 which opens to a hydraulic lubricant receiving fitting 38. The passage 63 has another end 65 which opens to a hydraulic lubricant pressure relief fitting 55 in the shaft 61, in the second wheel 12 of the pressurized lubricating system 60.

The passage 63 includes blocking screws 66 and 67, which form discontinuities in the passage, establishing a lubricant flow path, primarily through a passage 68 in the shaft 63. The passage 68 opens between the round cross-section O-rings 29, 30 in the body 14 of the thrust bearing 10. Thus, lubricant can flow and have access to the passage 20 in the body 14. Thus, because of the screw 66, lubricant entering the hydraulic receiving fitting 38, must follow the path through the passage 68 into the passage 20 in the body 14 and out the opening 25, into the circumferential groove 32, so that the lubricant can access the longitudinal channel 45 in the hub 13. The lubricant path then is through the longitudinal passage 45 into the channel 43 of the first bearing set 39, to and through the opening 42 in the outer race 41 to the needles 44 and to the inner race opening 47 of the first bearing set 39. From there the lubricant passes into the channel 48 of the inner race 46 in the bearing set 39 and through to the shaft passage 69, which opens into the shaft passage 63. The lubricant continues down the longitudinal channel 45 and follows a similar path through the second bearing set 40 into the passage 70, which leads into the passage 63. The lubrication continues down the passage 63 through the shaft 61 in the support 62 until it reaches blocking screw 67 in the second wheel 12 where the lubricant follows the same path through the first bearing set 39 and second bearing set 40 as it did in the first wheel 12, and reaches the hydraulic pressure relief fitting 55. Both wheels 12 and the shaft 61 are fully lubricated at the second thrust bearing 10 in the wheel 12, where lubricant in the longitudinal channel 45 in the hub 13, passes into the circumferential groove 32 in the face 26 of the body 14, so that lubricant may enter the passage opening 25, pass through the passage 20, exit through the passage opening 21 and enter the space between the round circumference O-rings 30 and 31.

Figure 3:
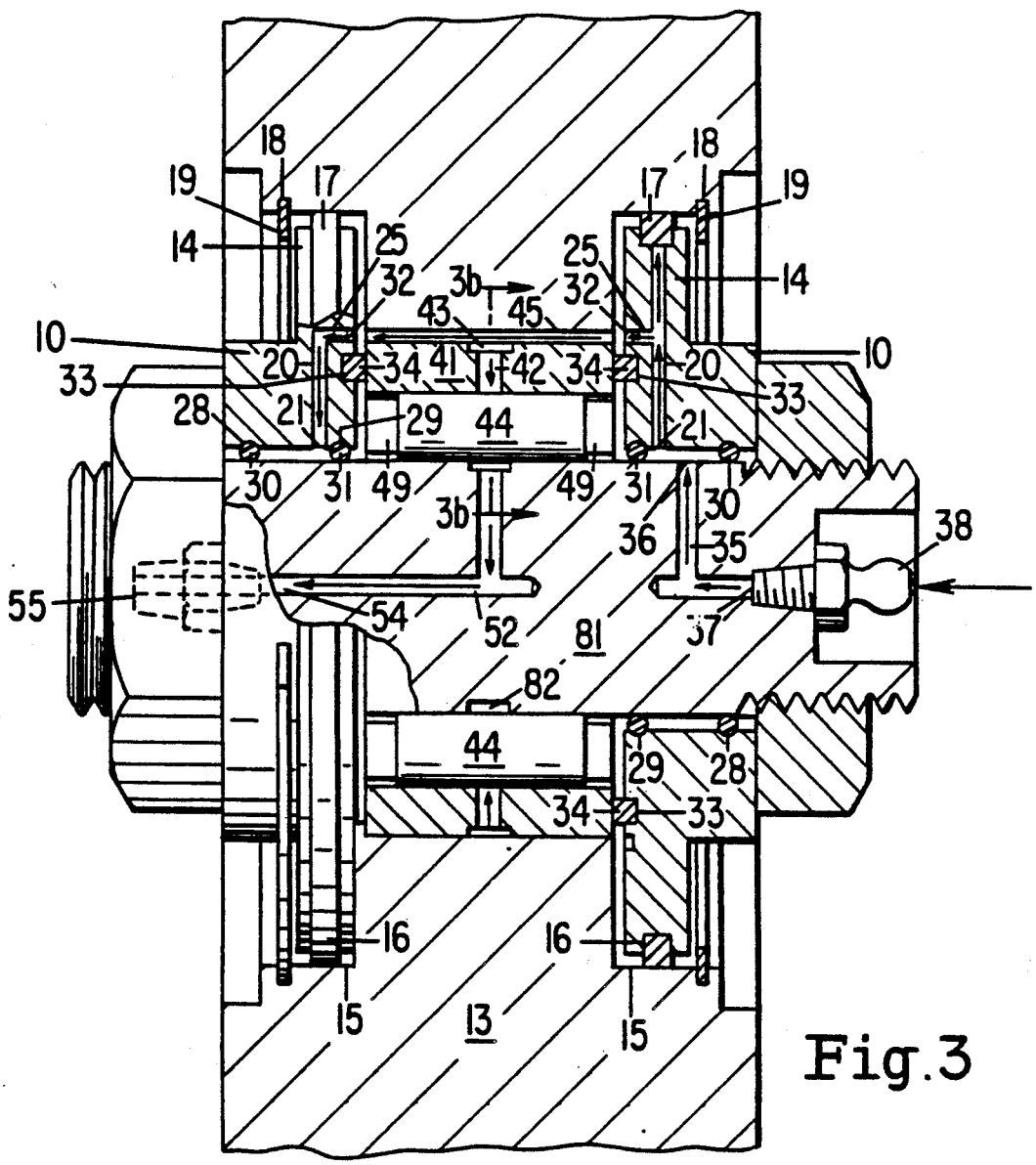
FIG. 3 is a section of a wheel on a hub having a bearing set without an inner race with thrust bearings of the present invention in a pressurized lubricating system.

The pressurized lubricating system 80, as shown in FIG. 3, has a shaft 81 with a passage 35 opening between the round cross-section O-rings 30 and 31 in the body 14 of the thrust bearing 10. The shaft 81 has a single passage 50 opening into a circumferential channel 82 in the shaft 81. A bearing set 83 has an outer race 41 with needles 44, but no inner race. The lubricant flow path is through the channel 43, opening 42 and through the passage 52.

Figure 4:
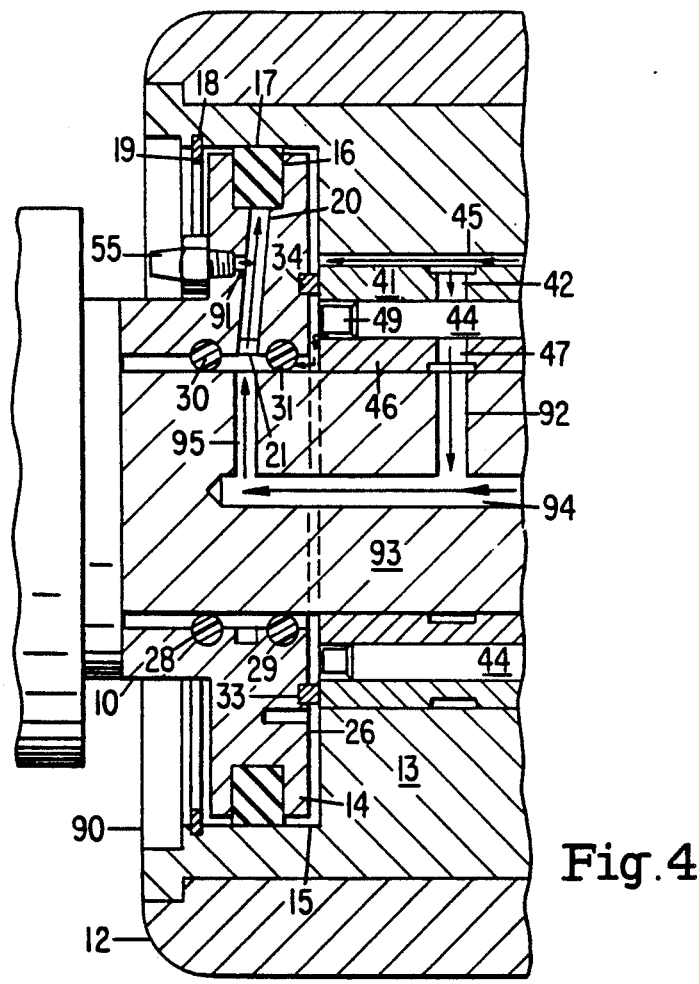
FIG. 4 is a sectional detail of a wheel on a hub showing lubricant flow through a shaft and a hydraulic pressure relief fitting in a thrust bearing of the present invention.

The pressurized lubricating system 90, as shown in FIG. 4, includes a hydraulic pressure relief fitting 55 in the body 14 of the thrust bearing 10, opening to a passage 91 in the body 14. The passage 91 is also open to the passage 20 in the body 14.

Figure 5:
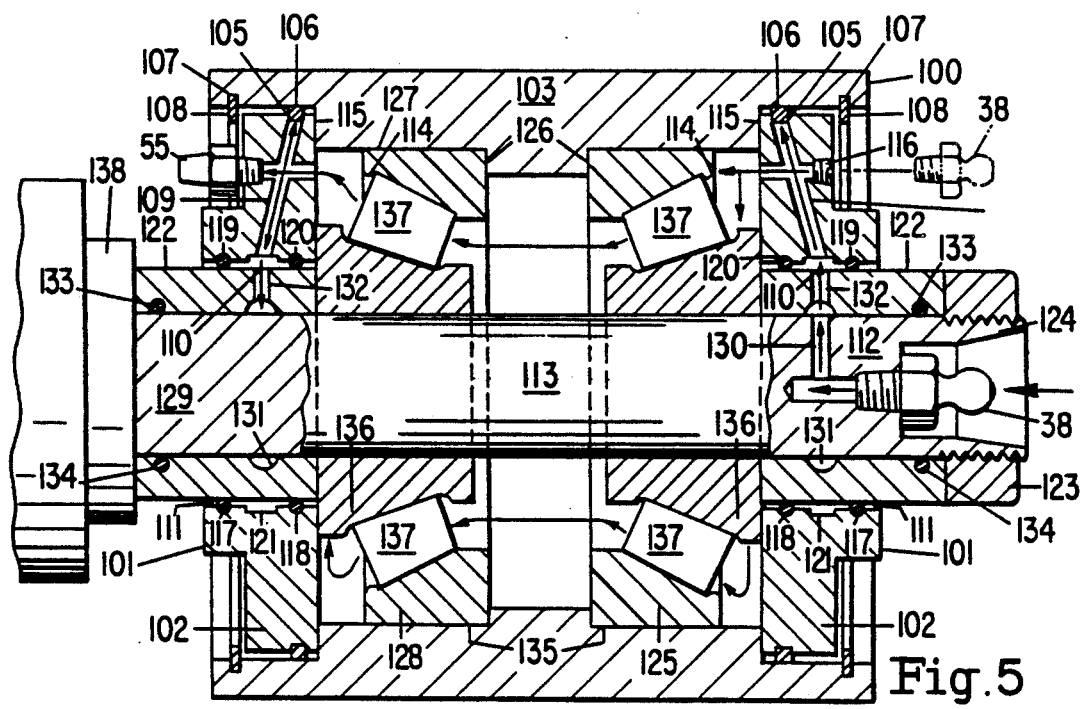
FIG. 5 is a section of a pressurized lubricating system including thrust bearings of the present invention and a stationary shaft with an outer rotating hub and tapered bearings.

The thrust bearing 101 of the present invention as shown in FIG. 5 is in a pressurized lubricating system 100, as shown in the hub 103. The thrust bearing 101 has a body 102, which is retained in a countersunk portion 104 of the hub 103.

The body 102 includes a circumferential groove 105 adapted to receive a circumferential square cross-section O-ring 106. The O-ring 106 abuts the countersunk portion 104 of the hub 103 and forms a seal against outflow of lubricant from the pressurized lubricating system 100.

The hub 103 includes a groove 107 adapted to receive a retaining ring 108, which holds the body 102 within the countersunk portion 104 of the hub 103. The square cross-section O-ring 106 forms a seal between the hub 103 and the body 102.

The body 102 includes a passage 109 which opens at one end 110 into a body opening 111. The body opening 111 is adapted to receive an end 112 of a shaft 113. The other end 114 of the passage 109 opens to a face 115 of the body 102. The passage 109 may also have an opening to a closure screw 116 in the body 102, which closes the passage 109 from the outside of the body 102.

Within the body opening 111, straddling the passage opening 110, are circumferential grooves 117 and 118, into which are fit round cross-section O-rings 119 and 120. The round cross-section O-rings 119 and 120 abut a bushing 122, forming a seal. The passage opening 110 opens into a circumferential groove 121 in between the O-rings 119 and 120.

The shaft end 112 is engaged in the bushing 122. The bushing 122 is held on to the shaft end 112 by a nut 123 tightened over a threaded portion 124 on the shaft end 112. The bushing 122 at one end abuts the tapered bearing set 125 holding it engaged in the hub 103 of the pressurized lubricating system 100 against the step 126. The step 126 defines an opening 127 between the bearing set 125 and the bearing set 128 also engaged in the hub 103. The bearing set 128 is held by the step 126 at one end and another bushing 122 at its other end. The other bushing 122 is mounted on the shaft end 129. The shaft end 129 is statically mounted on a base 138.

The shaft end 112 includes a passage 130 having an opening to a circumferential groove 131 in the bushing 122. The bushing 122 includes a passage 132 from the circumferential groove 131 which opens to the circumferential groove 121 in the body 102 between the two round cross-section O-rings 119 and 120. The other end of the passage 130 is closed by a hydraulic lubricant receiving fitting 38. It is preferable that the bushing 122 be sealed to the shaft 113 by an O-ring 133 in a groove 134.

The tapered bearing sets 125 and 128 are engaged on the shaft 113. They include outer races 135 and inner races 136. Within the outer races and inner races are tapered bearings 137. The inner and outer races 135 and 136 of the bearing sets 125 and 128 are open to the opening 127 in the hub 103, providing a lubricant path from the hydraulic lubricant receiving fitting 38 through the passage 130 and the passage 132, through the passage 109, so that lubricant can flow from the tapered bearing set 125 into the tapered bearing set 128, into the second thrust bearing 101 in the pressured lubricating system 100 and through the passage 109 in the body 102 of the second thrust bearing 101. A hydraulic pressure relief fitting 55 opens to the passage 109 in the second thrust bearing 101.

Figure 6:
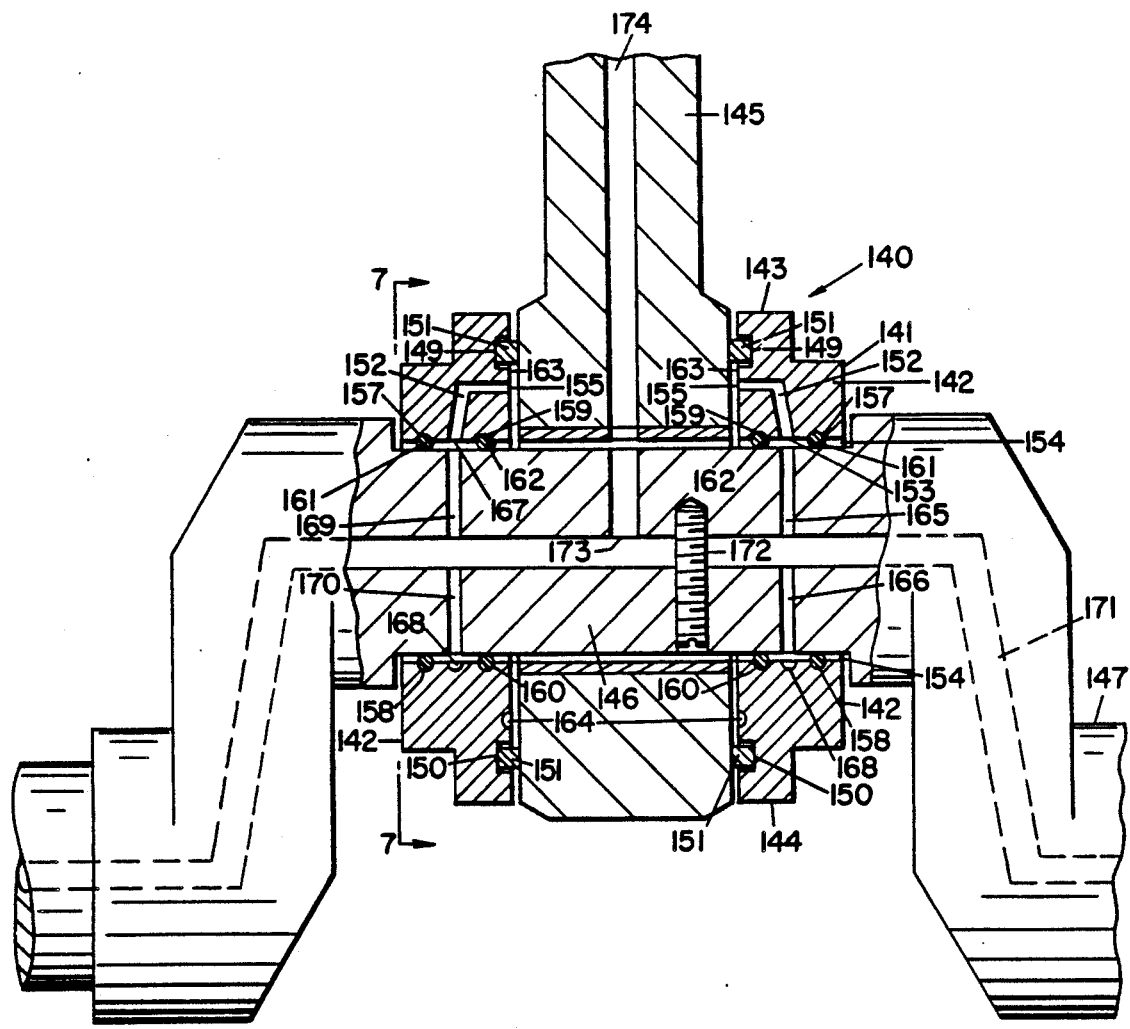
FIG. 6 is a section through a crankshaft with a piston rod connected to the crankshaft in a pressurized lubricating system including modified thrust bearings of the present invention.

The thrust bearing 141 of the present invention as shown in FIG. 6, is in a pressurized lubricating system 140. The thrust bearing 141 has a body 142, including a first section 143 and a second section 144. The thrust bearing 141 is adapted to be engaged with a piston rod 145, acting as a hub. The piston rod 145 is engaged on a crankpin 146 on a crankshaft 147 in the pressurized lubricating system 140.

Figure 7:
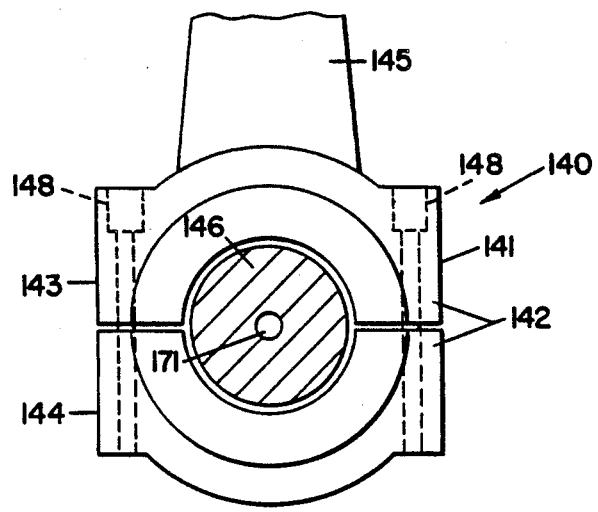
FIG. 7 is a side elevation of FIG. 6 taking along lines 7-7.

As can be seen in FIG. 7, the body 142 is in two sections, 143 and 144. These sections can be joined by conventional screw means 148, as shown dotted in FIG. 7.

The body sections 143 and 144 include contiguous circumferential grooves 149, 150, adapted to receive a circumferential square cross-section O-ring 151. The O-ring 151 abuts the piston rod 145 and forms a seal against the outflow of lubricant from the pressurized lubricating system 140.

The first body section 143 includes a passage 152 which opens at one end 153, into the body opening 154 portion in the section 143. The entire body opening 154 is adapted to receive the crankpin 146. The other end 155 of the passage 152 opens to a face 156 of the body 142. The sections 143 and 144 coact as a single body 142.

In the body 142, including portions in the first section 143 and second section 144 of the body 142, straddling the passage opening 153, are contiguous circumferential grooves 157, 158 and contiguous circumferential groove sections 159, 160 into which are fit round cross-section O-rings 161, 162. The round crosssection O-rings 161 and 162 abut the crankpin 146, forming a seal. The passage opening 155 opens into a contiguous circumferential groove 163 in the body section 143, which is contiguous with a circumferential groove 164 in the body section 144.

The passage opening 153 opens into a contiguous circumferential groove 167 in the body section 143, which is contiguous with the groove 168 in the body section 144.

The crankpin 146 includes passages 165 and 166 at one end, which open between the O-rings 161 and 162 and passages 169 and 170 at the other end of the crankpin 146, which open between the O-rings 161 and 162 in the body 142 of another thrust bearing 141 in the pressurized lubricating 140. The passages 165, 166, 169 and 170 in the crankpin 146 also open to a passage 171 in the crankshaft 147, which is part of the pressurized lubricating system 140.

The stop pin 172 interrupts the flow of lubricant through the passage 171, setting up a flow path of lubricant from the passage 171 through the passages 165 and 166. The lubricant then passes through the passage 152, and between the piston rod 145 and the thrust bearing 141. From there the lubricant passes between the crankpin 146 and the piston rod 145, then through the passage 173 in the crankpin 146. The lubricant then divides its movement back into the passage 171 through the passage 173, passing through the piston rod 145, through the passage 174, through the space between the piston rod 145 and the second thrust bearing 141 in the pressurized lubricating system 140, then though the passage 152 in the thrust bearing body 142 through the passages 169 and 170, back through the passage 171 in the crankshaft 147.

The thrust bearing 181 of the present invention as shown in FIG. 8 is in a pressurized lubricating system 180, as shown in an encasement 182. The thrust bearing 181 has a body 183, which is retained in a countersunk portion 184 of the encasement 182.

The body 183 includes a circumferential groove 185 adapted to receive a circumferential square cross-section O-ring 186. The O-ring 186 abuts the countersunk portion 184 of the encasement 182 and forms a seal against outflow of lubricant from the pressurized lubricating system 180.

The encasement 182 includes a groove 187 adapted to receive a retaining ring 188, which holds the body 183 within the countersunk portion 184 of the encasement 182. The square crosssection O-ring 186 forms a seal between the encasement 182 and the body 183.

The body 183 includes a body opening 189. The body opening 189 is adapted to receive a shaft 190. The body 183 includes a first passage 191 and a second passage 192 which open to a circumferential groove 193. The passage 191 is closed by a hydraulic lubricant receiving fitting 38. The passage 192 is closed by a hydraulic pressure relief fitting 55.

within the body opening 189, is a circumferential groove 194 into which is fit round cross-section O-rings 195. The round cross-section O-ring 195 abuts the shaft 190, forming a seal. Within the encasement 182 is another circumferential groove 194 into which is fit a round cross-section O-rings 197. The round cross-section O-ring 197 abuts the shaft 190, forming another seal. There is another circumferential groove 198 in the body 183 in the face 199 of the body 183 into which is set another square cross-section O-ring 200.

Engaged on the shaft 190 is a bearing set 201. The bearing set 201 includes an outer race 202 and an inner race 203. The bearing set 201 includes balls 204 within the races 202 and 203. The shaft 190 also extends through an opening 205 in the encasement 182 in rotatable sealed engagement with the round crosssection O-rings 197. The encasement 182 includes a circumferential groove 206 adapted to receive a circumferential square cross-section O-ring 207.

The O-ring 207 abuts the outer race 202 and forms a seal against outflow of lubricant from the pressurized lubricating system 180. The O-ring 200 also abuts the outer race 202 and forms a seal against outflow of lubricant from the pressurized lubricating system 180.

The flow path of lubricant is from the hydraulic lubricant receiving fitting 38 through the first passage 191 between the races 202 and 203 to the balls 204 through the entire bearing set 201, through to the O-rings 195 and 197 and to the second passage 192 and the hydraulic pressure relief fitting 55 where excess lubricant may be expelled.

The O-rings as set forth in FIGS. 9 through 13 are particularly adaptable for use with the pressurized lubricating system 140 of FIGS. 6 and 7.

The O-ring 210 as shown in detail (cut away) in FIG. 9, has joinable ends 211 and 212. The ends 211 and 212 are flared and abut each other. The end 211 includes an extending portion 213, which is adapted to interfit into an opening 214 in the end 212. As shown in FIGS. 9 and 10, the O-ring 210 has a basically square cross-section configuration. The extending portion 213 has ridges 215 to form fluting, which engages the ridges 216 inside the opening 214.

In FIG. 11, a round cross-section O-ring 220 is shown in cut-away detail, with flared ends 211, 212, and an extending portion 213, opening 214 and ridges 215 and 216 such and shown with regard to the O-ring 210. As shown in FIG. 12, the O-ring 220 is shown exploded open before the ends 211 and 212 have been joined.

As shown in FIG. 13, a square cross-section O-ring 230 includes step ends 231, 232, which may be flared (not shown). The O-ring 230 may be engaged in an appropriate groove with the ends 231 and 232 overlapped to form a complete seal.

The thrust-bearing 10 in the pressurized lubricating system 11, as shown in FIG. 1, provides a means for complete lubrication in a wheel 12, particularly where a grease lubricant is used. Grease is put into the pressurized lubricating system 11 under pressure, through the hydraulic lubricant receiving fitting 38, which is located in the end 23 of the shaft 24. The grease passes through the passage 35 at the end of the shaft 23 and enters the space in the body 14 of the thrust bearing 10. The grease may then entirely fill the circumferential space between the round O-rings 30 and 31. The grease is also, under pressure, forced through the passage 20 in the body 14 and out through the passage opening 25.

The body 14 is provided with a circumferential groove 16, into which a square cross-section O-ring 17 is engaged.

In the preparation of the passage 20, it is convenient to drill a hole through the groove 16 with an intersecting portion having an opening 27. It is necessary for the passage 20 to be closed at the groove 16 to avoid the outflow of lubricant through the thrust bearing 10. The square cross-section O-ring 17 seals the opening 27 and prevents the outflow of grease from the body 14. The square cross-section O-ring 17 also forms a seal between the body 14 of the thrust bearing 10, so that grease, under pressure, in the pressurized lubricating system 11 may not leak. The square cross-section O-ring 17 abuts the wall of the hub 13 in the countersunk portion 15 and prevents the grease outflow.

Grease exiting from the passage opening 25 is contained in the pressurized lubricating system 11 between the square crosssection O-ring 17 and a second square cross-section O-ring 34 which is held in a circumferential groove 33 in the face 26 of the body 14.

Grease forced in under pressure fills the entire circumferential space between the square cross-section O-ring 17 and the square cross-section O-ring 34. The grease is forced to find the opening to the longitudinal channel 45 in the hub 13, where it is forced under pressure to reach the circumferential channel 43 of the outer race 41 of the first bearing set 39. The grease moves along the longitudinal channel 45 in the hub 13 toward the second bearing set 40, while at the same time the pressure of the grease forces grease through the opening 42 in the outer race 41 of the first bearing set 39. The grease fully fills the space between the outer race 41 and the inner race 46 complete covering the needles 44 and filling the entire bearing set 39, 40, including passing through the opening 47 in the inner race 46 and into the circumferential channel 48 in the inner race 46 which abuts the shaft 24. The grease, under pressure, passes through the passage 50 in the shaft 24 and moves on toward the hydraulic pressure relief fitting 55. The pressurized grease continuing through the longitudinal channel 45, reaches the channel 43 of the second bearing set 40 and follows the same path as it followed with regard to the first bearing set 39, completing filling the bearing set 39, 40 with grease.

The grease in the channel 45 reaches the circumferential groove 32 in the second thrust bearing 10 in the pressurized lubricating system 11 and is led through the passage 20 to the space between the two round cross-section O-rings 30 and 31, where the grease completely fills the space surrounding the shaft end 53.

The thrust bearing 10 is held within the countersunk portion 15 of the hub by retaining ring 19 in the groove 18.

The manner the grease is put into the pressurized lubricating system 11, following the path as hereinbefore described, leaves no voids in the pressurized lubricating system 11. As a precaution, grease is input through the hydraulic lubricant receiving fitting 38 to fill the system, and at a pressure, such that when the system is filled, excess grease is released from the hydraulic pressure relief fitting 55, as a reassurance that the entire system is filled. Both the hydraulic lubricant receiving fitting 38 and the hydraulic pressure relief fitting 55 may thereafter maintain the grease in the system, under constant pressure.

The grease filling the entire system prevents the entry of contaminants as well as making certain that there are no contaminants in the pressurized lubricating system, or voids where there is no grease or insufficient grease for the proper lubrication of the wheel 12.

The square cross-section O-ring 17 and the square crosssection O-ring 34 are in a static relationship with the wall of the countersunk portion 15 and the outer race 41. The hub 13 rotates about the shaft 24 with the outer races 41 and needles 44 moving about the inner races 46, which do not move on the shaft 24. The round O-rings 30 and 31 rotate about the shaft ends 23 and 53 without losing pressure within the system, nor without the release of pressurized grease within the pressurized lubricating system 11.

The wheel 12 has an increased useful life with longer periods between necessary lubrications and is protected against internal wear and corrosion from outside the pressurized lubricating system 11.

In FIG. 2, the thrust bearing 10 is shown employed in a pressurized lubricating system 60 where two wheels 12 are joined on a shaft 61, which is mounted in a support 62.

The lubricant, preferably grease, is put into the system under pressure through the hydraulic lubricant receiving fitting 38. In order for the grease to properly lubricate, fill both wheels 12 and fill all voids, it is preferable that the grease follow a path through the passage 68 in the shaft 61 and traverse a path substantially identical to the path followed by the grease in the pressurized lubricating system 11 of FIG. 1.

For convenience, the shaft 61 has a single passage 63, preferably drilled through the shaft from end to end. In order for the grease to follow the preferred path, blocking screws 66 and 67 interrupt the straight flow of grease in the pressurized lubricating system 60, so that it must follow the path through the shaft 61 in the passage 63. The grease is blocked by the blocking screw 67 and must then follow the path through the various passages 68', 69' and 70' until grease reaches the pressure relief fitting 55 after having filled all the voids in the pressurized lubricating system 60.

Of course, means other than use of blocking screws, per se, may be used within the shaft 61 in order to establish the desired flow patterns.

The thrust bearing 10, as shown in FIG. 3 in the pressurized lubricating system 80, includes a single bearing set 83, having an outer race 41 with needles 44, held by cages 49, rolling directly on the shaft 81. The lubricant flow, in this instance, preferably grease, follows the same pattern of entering the pressurized system 80 through the hydraulic lubricant receiving fitting 38 and being held within the system by the hydraulic pressure leaf fitting 55. Lubricant flows through the channel 45' into the circumferential channel 43 and through the opening 42 in its flow path through the pressurized lubricating system 80.

In FIG. 4, the flow path of lubricant, preferably grease, is modified by having the hydraulic pressure relief fitting 55, located in a passage 91 in the body 14. The passage 91 opens to the passage 20. The lubricant flow follows substantially the same path through the outer race 41 and opening 42, past the needles 44 into the opening 47 through the opening 92 in the shaft 93, thence through the passage 94 to the passage 95, thence upward into the passage 20 in the body 14.

In FIG. 5, the thrust bearing 101 is shown in a pressurized lubricating system 100, with tapered bearings 137. The flow path is substantially the same as in the other pressurized lubricating systems with the exception that lubricant, in this case preferably grease, passes from the passage 130 in the shaft 113 through a passage 132 in a bushing 122 over the shaft 113. The passage 132 opens to a circumferential groove 131 in the bushing 122. The grease fills the pressurized lubricating system without any voids and maintains lubrication within the system under pressure for all of the parts.

The thrust bearing 141, as shown in the pressurized lubricating system 140 in FIG. 6, is primarily intended for an oil lubricating system to maintain lubrication in a system including a crankshaft 147. In this embodiment, the body 142 is in two joined sections around a crankpin, 146. The oil passing through the passage 171 is diverted by the stop pin 172 so that it flows through the passage 165 in the crankpin 146 through the passage 152 in the body 142 and thence the oil flows between the crankpin 146 and the first and second body portions 143 and 144 and through the second thrust bearing 141 in the pressurized lubricating system 140. Since the body 142 is in sections, the seals in the body sections 143 and 144 must be able to be effective and be set in position around the crankpin 146. This may be done by means known in the art, such as disclosed in U.S. Pat. No. 3,929,394, where abutting ends of seals form a seal in sections about a crankpin.

Square cross-section O-ring 210, such as shown in FIGS. 9 and 10 and round cross-section O-ring 220, such as shown in FIGS. 11 and 12 may be employed, as well as open stepped O-ring 230, such as shown in FIG. 13.

The thrust bearing 181, such as shown in the encasement 182 in FIG. 8, in the pressurized lubricating system 180, is adapted to a pressurized lubricating system 180, where a shaft 190 is likely to be a rotatable shaft, such as in an electrical motor, and the encasement 182 is a stationary part. The system 180 is filled with lubricant under pressure, preferably grease, which fills the entire encasement 182 and bearing set 201 with grease, leaving no voids. The round cross-section O-ring 195 bears against the shaft 190 and with the round cross-section O-ring 197 forms a seal with the rotating shaft 190, which contains the grease under pressure and against outflow. The encasement 182 is sealed against the outer race 202 of the bearing set 201 by the square cross-section O-ring 207.

The bodies of the thrust bearings 10, 101, 141 and 181 are preferably of bronze. The encasement 182 is preferably of bronze.

The square cross-section O-rings in the various embodiments are preferably in a static relationship with a hub-like portion, whether or not the hub in itself rotates. The round crosssection O-rings are preferably in contact with the moving parts.

The pressurized lubricating system of FIG. 1 is in the form of a wheel. The hub 13 rotates about the shaft 24. Although the hub 13 is in rotation, there is no relative movement between the hub 13 and the square cross-section O-ring 17 and the square cross-section O-ring 34. The square cross-section O-ring 34 abuts the outer race 41 of the bearing sets 39 and 40 without any relative movement between the outer race and the square cross-section O-ring 34. These O-rings form a seal which directs the lubricant flow within the pressurized lubricating system 11 and guides the lubrication to fill the entire system, and yet maintain lubricant within the system against the pressure of the lubricant. In FIG. 1, the thrust bearing 10 and its body 14 rotate with the hub 13 about the shaft 24. The round cross-section O-rings 29 and 30, although they are in a movable relationship with the ends of the shaft 23 and 53, are still able to maintain the pressurized lubricant against outflow from the pressurized lubricating system 11. The various grooves, openings, passages and channels, all intersect, so that the entire inner workings in the systems are completely accessed by lubricant.

The preferably flow pattern in the pressurized lubricating systems 11, 60, 80 and 90, is from the outside of the outer race 41, thus a flow path from the hydraulic lubricating receiving fitting 38 to the hydraulic pressure relief fitting 55 purges air and contaminants within the pressurized lubricating systems 11, 60, 80 and 90, filling the pressurized lubricating systems 11, 60, 80 and 90 with lubricant, maintaining it free of contaminants and maintaining the complete lubrication of the systems themselves.

The flow path of lubricant in the pressurized lubricating system 100, as shown in FIG. 5, also acts to purge the system of voids and contaminants and maintain the system in working condition under pressure. The pressurized lubricating system 100, as shown in FIG. 5, is adaptable to the hub of heavy duty wheels, such as on trucks.

The pressurized lubricating system 140 as shown in FIGS. 6 and 7 in an oil lubricating system, maintains a full engagement of lubricant against all moving parts and avoids, in particular, the extra wear at start up in the systems of the past where lubricant has not had a full opportunity to be circulated and distributed.

The encasement 182, as shown in FIG. 8, acts substantially as the second thrust bearing in the pressurized lubricating systems 11, 60, 80, 90, 100 and 140, to contain the seals to keep the lubricant within the system under pressure and without leakage.

The terms and expressions which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A thrust bearing for a pressurized lubricating system, said thrust bearing including a body, said body adapted to be engaged at hub means in said lubricating system, said body adapted to be sealed against outflow of lubricant at said hub means, said body further adapted to be engaged at shaft means in said lubricating system, said body including an opening adapted to receive said shaft means therethrough, said body adapted to be sealed against outflow of lubricant at said shaft means, and said body adapted to be retained in said lubricating system, said shaft means seal against outflow of lubricant including a pair of O-rings, a pair of circumferential grooves in said body opening adapted to receive said shaft means, said pair of shaft means seal O-rings are adapted to fit in said grooves, said body includes at least one passage therethrough, said at least one passage therethrough adapted to guide lubricant either to or from said shaft means, said at least one passage therethrough open at one end between said shaft seal means O-rings.

2. The invention of claim 1 wherein said body includes a face adapted to juxtapose to bearing means in said lubricating system, said face including a circumferential groove, said at least one passage opening to said circumferential groove, said circumferential groove adapted to guide lubricant either to or from bearing means in said lubricating system.

3. The invention of claim 1 including means in said body adapted to receive grease under pressure in said lubricating system, said means adapted to receive grease adapted to retain such grease under pressure, said means adapted to receive grease under pressure opening in said at least one passage.

4. The invention of claim 1 including means adapted to retain grease under pressure in said lubricating system, said retaining means adapted to release grease in excess of a selected pressure, said retaining means opening to said at least one passage.

5. A thrust bearing for a pressurized lubricating system, said thrust bearing including a body, said body adapted to be engaged at hub means in said lubricating system, said body adapted to be sealed against overflow of lubricant at said hub means, said body further adapted to be engaged at shaft means in said lubricating system, said body including an opening adapted to receive said shaft means therethrough, said body adapted to be sealed against outflow of lubricant at said shaft means, said body adapted to be retained in said lubricating system, said hub means seal against outflow of lubricant includes at least one O-ring, at least one further hub means seal, said at least one further hub means seal includes an O-ring, said at least one further hub means seal is a square cross-section O-ring, at least one further groove in said body, said at least one further hub means seal O-ring 6. A thrust bearing for a pressurized lubricating system, said thrust bearing including a body, said body adapted to be engaged at hub means in said lubricating system, said body adapted to be sealed against outflow of lubricant at said hub means, said body further adapted to be engaged at shaft means in said lubricating system, said body including an opening adapted to receive said shaft means therethrough, said body adapted to be sealed against outflow of lubricant at said shaft means, and said body adapted to be retained in said lubricating system, means in said body adapted to retain grease under pressure in said lubricating system, said retaining means adapted to release grease in excess of a selected pressure.

7. A thrust bearing for a pressurized lubricating system, said thrust bearing including a body, said body adapted to be engaged at hub means in said lubricating system, said body adapted to be sealed against outflow of lubricating at said hub means, said body further adapted to be engaged at shaft means in said lubricating system, said body including an opening adapted to receive said shaft means therethrough, said body adapted to be sealed against outflow of lubricant at said shaft means, and said body adapted to be retained in said lubricating system, said body includes a plurality of sections, said shaft means is a crankpin, said crankpin seal against outflow of lubricant includes a pair of O-rings, a pair of circumferential grooves in said body opening adapted to receive said crankpin, said pair of crankpin seal O-rings are adapted to fit in said grooves, said body includes at least one passage therethrough, said at least one passage therethrough adapted to guide lubricant either to or from said crankpin, said at least one passage therethrough open at one end between said shaft seal means O-rings.

8. The invention of claim 1 including an inner circumferential groove between a pair of shaft seal means O-rings.

9. A thrust bearing for a pressurized lubricating system, said thrust bearing including a body, said body adapted to be engaged at hub means in said lubricating system, said body adapted to be sealed against outflow of lubricant at said hub means, said body further adapted to be engaged at shaft means in said lubricating system, said body including an opening adapted to receive said shaft means therethrough, said body adapted to be sealed against outflow of lubricant at said shaft means, and said body adapted to be retained in said lubricating system, said lubricating system includes rotatable bearing means, race means in said lubricating system, said rotatable bearing means are adapted to rotate within said race means, said lubricant in said lubricating system is grease, said hub means seal against outflow of grease includes at least one O-ring, said shaft means seal against outflow of grease includes a pair of O-rings, said body includes at least one passage therethrough, said at least one passage therethrough adapted to guide grease either to or from said shaft means, said at least one passage therethrough open at one end between said shaft seal means O-rings, means in said lubricating system adapted to receive and retain grease under pressure, said means in said lubricating system adapted to receive and retain grease under pressure further adapted to release grease in excess of a selected pressure, said rotatable bearing means mounted on said shaft means, and means in said lubricating system adapted to guide said grease to fill said lubricating system substantially without any voids.

10. The invention of claim 9 wherein said race means include at least an outer race.

11. The invention of claim 10 including at least one inner race.

12. The invention of claim 10 wherein said means in said lubricating system adapted to guide grease to fill said lubricating system includes at least one opening in said race means, said means adapted to guide said grease to fill said lubricating system further adapted to guide said grease through said bearing means to said shaft means.

13. The invention of claim 12 wherein said means in said lubricating system adapted to guide grease to fill said lubricating system includes at least one channel in said race means, said at least one opening in said race means open to said at least one channel.

14. The invention of claim 13 wherein said means adapted to guide said grease to fill said lubricating system includes means adapted to guide said grease through said shaft means.

15. The invention of claim 14 wherein said means adapted to guide said grease to fill said lubricating system is adapted to guide said grease in a path from said race means opening and through said shaft means.

16. The invention of claim 9 wherein said means in said lubricating system adapted to receive and retain grease under pressure are included at least partially in said body.

17. The invention of claim 9 wherein said means in said lubricating system adapted to receive and retain grease under pressure are included at least partially in said shaft means.

* * * * *